Oct. 15, 1946.   A. B. CARMICHAEL   2,409,418
VEHICLE STEP
Filed Dec. 4, 1945    2 Sheets-Sheet 1
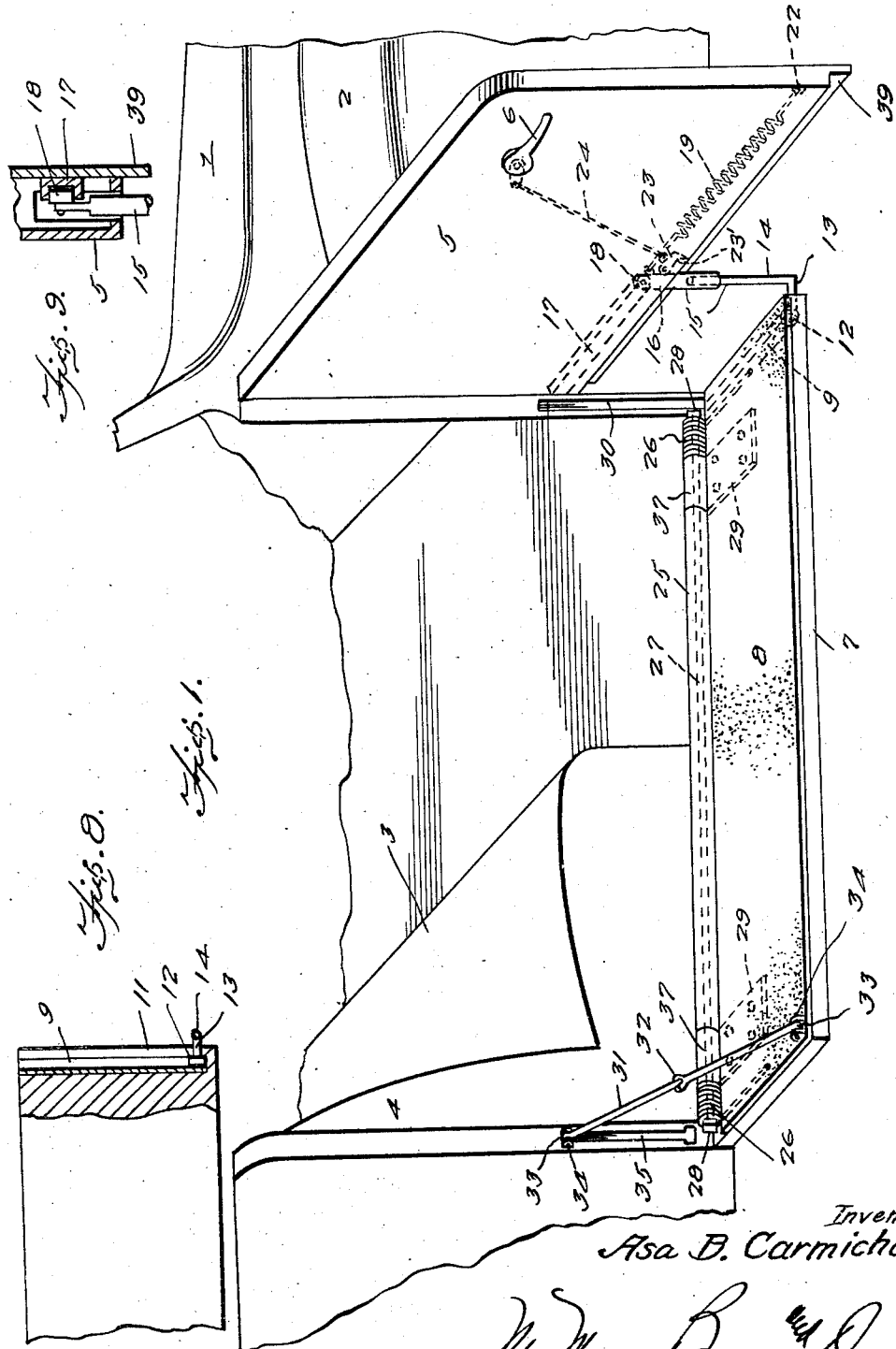
Inventor
Asa B. Carmichael
Attorneys Oct. 15, 1946.   A. B. CARMICHAEL   2,409,418
VEHICLE STEP
Filed Dec. 4, 1945   2 Sheets-Sheet 2
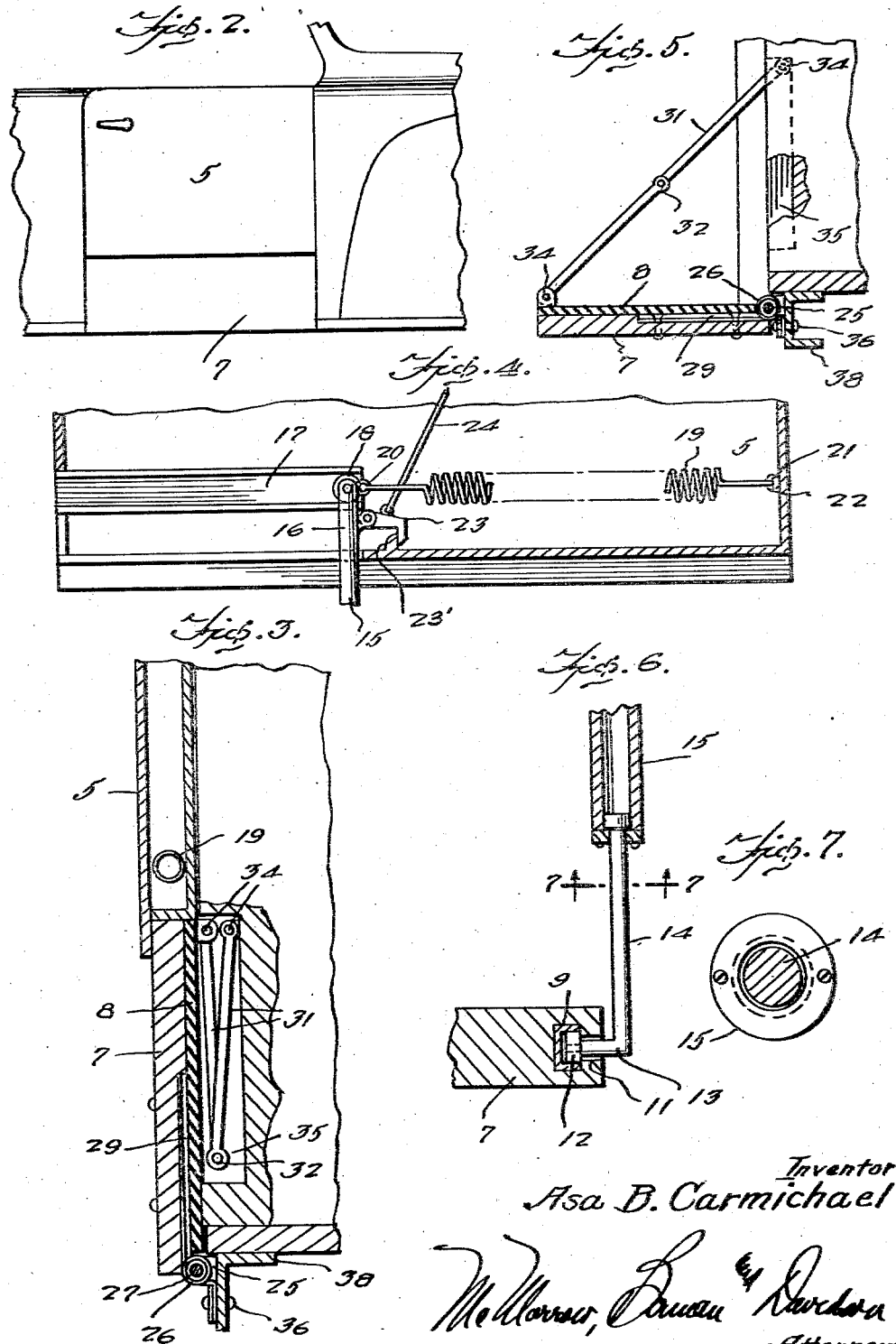

Patented Oct. 15, 1946

2,409,418

UNITED STATES PATENT OFFICE 2,409,418

VEHICLE STEP

Asa B. Carmichael, Tujunga, Calif.

Application December 4, 1945, Serial No. 632,742

3 Claims. (Cl. 280—166)

This invention relates to a vehicle step, the general object of the invention being to provide a disappearing step which will be hidden from view when the door of the vehicle is closed, and which will be moved to operative position when the door is opened.

An object of the invention is to provide an improved means adapted to be operated in response to opening and closure of a door for projecting and retracting a step, or other like supporting structure.

It is a further object of the invention to provide a vehicle step which shall be substantially flush with the body of the vehicle when closed and which shall be hingedly dropped to open or operative position in response to opening of the vehicle door, and which shall be locked in such open or operative position subject to release by operation of a lever which normally actuates a door lock of the vehicle.

With the above and other objects in view, the invention consists in the novel features of construction, the combination and the arrangement of parts hereinafter more fully set forth, pointed out particularly in the appended claims, and shown in the accompanying drawings, wherein like numerals of reference refer to the same parts in the several views, and wherein:

Figure 1 is a perspective view of the invention shown associated with an automotive vehicle of generally conventional character;

Figure 2 is an elevational view of a portion of a vehicle, including the invention, which is illustrated as closed;

Figure 3 is a cross sectional view of a vehicle door provided with the device of my invention;

Figure 4 is a view, partly in section of a latch structure associated with the device of the invention;

Figure 5 represents a view partly in section of means for supporting the step or shelf embodied in the invention;

Figure 6 is a front elevational view partly in section of a detail of the invention;

Figure 7 is an enlarged sectional view taken on line 7—7 of Figure 6;

Figure 8 is a view in plan of a detail of the step actuating mechanism associated with the device of the invention; and Figure 9 is a sectional view taken on an end of the vehicle door, and illustrating further details of the step actuating mechanism.

Referring now to the drawings, and in particular to Figure 1, it will be evident that the numeral 1 represents the hood of an automotive vehicle, 2 a fender, 3 a seat cushion and 4 a back rest, both 3 and 4 being interiorly of the vehicle, and that 5 represents the door of such a vehicle having a handle 6 for operating a latch which is normally associated with such doors.

Parts such as are designated by numerals 1 to 6 are conventional, generally, in automotive and other types of vehicles. I have here chosen to illustrate my invention in connection with its application to an automotive vehicle, not intending thereby to limit myself to such use, but by way of illustration and example only, it being deemed to come within the purview of mere mechanical skill to apply the invention to other types of vehicles, such as aircraft, boats and trains, if desired.

The door 5 swings on hinges (not illustrated) to open or closed positions and in so doing actuates a step or shelf 7 to the extended position illustrated in Figure 1 of the accompanying drawings when the door 5 is open, and to a position in substantial coplanar alignment with the door 5, when said door 5 is closed, as is illustrated in Figure 2 of the accompanying drawings, wherein it appears to the casual observer that door 5 and step 7 are in fact a single structure.

Referring now to Figures 1 and 6 of the drawings step 7 is illustrated as covered with a rubber mat 8, under which and formed within the right hand end of step 7 is a slot 9, which may have communication with the end by means of a narrower slot 11 coextensive with the slot 9.

Riding within the slot 9 is a roller 12, which is rotatably mounted with respect to bent rod 13, extending upwardly, as at 14 to extend within a telescoping member 15.

The upper end 16 of telescoping member 15 is pivotally mounted within the runway 17 by means of a small wheel 18, secured to upper end 16 of member 15 as by riveting, bolting or other convenient method (see Figure 4) and is further flexibly secured against translation in runway 17 by means of a tension spring 19, which is attached by means of eyelets or hooks 20, 21 which are secured respectively to the end 16 of member 15 and to the frame of door 5 at a point designated 22.

Further, pivotally secured to the end 16 of member 15 is a latch 23 which locks on a coacting lug 23', unless prevented by an upward pull exerted on said latch 23 by cable 24, which in turn is secured to door latch actuating member 6, for operation thereby.

It will be apparent that as the door 5 of the vehicle door is moved from its open position, as illustrated in Figure 1, to the closed position illustrated in Figure 2, that the following mechanical operations occur. First, the lever 6 is actuated by the operator to exert tension on cable 24 thereby to lift latch 23 to cause its disengagement from the lug 23'. Substantially simultaneously door 5 is moved towards its closed position by exertion of pressure thereagainst. Motion of the door 5 is transmitted to the step 7 via links 15 and 14 to cause step 7 to pivot about its hinge mounting 25, the roller 12 riding in the slot 9, during this phase of the operation, and the major forces tending to close the door deriving from the roll springs 26 as well as from the motion of the door 5. During the translatory motion of member 15 and rod 14, said rod 14 is of course free to move telescopically within the member 15, to provide the necessary flexibility of coupling.

The step 7 pivots on a bolt 27 which extends for the entire length of the step 7, along the rearward edge thereof internally of a tube 25 which surrounds said bolt 27 over a major portion of its length and which is secured as by rivets or bolts to the body or frame of the vehicle 38, as is illustrated at 36 in Figures 3 and 5 of the drawings.

Surrounding the rod 27 at portions of its length adjacent each end of said rod 27 are further tube sections 37, which surround both end portions of rod 27 and which comprise extensions 29, riveted or bolted to the step 7. Within each tube section 37 is located a roll spring 26, surrounding bolt 27 and secured at one end to the car wall below the inside floor level, and fastened at the other end to the step 7. The ends of the bolt 27 are provided with welded nuts 28, to retain the bolt 27 in its relation to the tube sections 25 and 37.

A recess 30 is provided in the body of the vehicle, into which member 15 and rod 14 may nest when the vehicle door is fully closed, and the step 7 fully retracted.

At the left end of step 7 is provided a bracket 31, having hinge 32 centrally thereof, and pivotally secured at its ends by means of eyelets 33 formed in said ends and bearing on pins 34 secured respectively to the vehicle frame and the step 7, by suitable lugs. Bracket 31 nests within slot 35 when the step 7 is closed, and extends to the position illustrated in Figure 1 to aid in supporting step 7, when step 7 is open.

For best operation of my novel vehicle step the force exerted by spring 26 should approximately match that exerted by spring 19, to provide an approximate balance of forces.

In the operation of the device when a passenger desires to alight from the vehicle he has only to open the door, which will cause concurrent opening of the step 7. Upon closing the door 5, the step is automatically retracted, the upper or outward edge of the step being covered by an overlap 39 in the door, to hold the step firmly in place when the door is closed, as well as to keep rain and dust from access to the vehicle.

While I have described herein one embodiment of my invention it is to be understood that changes in arrangement, in construction, and in detail may be made, and will nevertheless fall within the spirit of the invention, as defined in the appended claims.

What I claim is:

1. In a device of the character described, the combination with a vehicle door and a vehicle frame, of a step, means hingedly securing said step to said frame, a translatable bracket for supporting said step, means in said frame for containing said bracket, means responsive to opening of said door for opening said step and removing said bracket from said means for containing, said third named means being responsive to closure of said door for effecting retraction of said step, and for effecting withdrawal of said bracket into said means for containing.

2. In a device of the character described, the combination with a vehicle frame and a vehicle door, of a step, hinge means securing said step to said vehicle frame, spring means associated with said hinge means tending to move said step into retracted position, a slot formed in an end of said step, a bracket having a roller for riding in said slot, said bracket being translatable to a first or a second position, spring means tending to retain said bracket in said first position, means responsive to closure of said door for moving said bracket to said second position and said step to retracted position.

3. In a device of the character described, the combination with a vehicle frame and a vehicle door, of a step, hinge means securing said step to said vehicle frame, spring means associated with said hinge means tending to move said step into retracted position, a slot formed in an end of said step, a bracket having a roller for riding in said slot, a runway associated with said vehicle door, means secured to said bracket for riding in said runway, said bracket comprising two telescoping members, spring means tending to retain said bracket in a first position, and means responsive to closure of said door for causing said bracket to assume a second position and responsive to opening of said door for causing said bracket to assume said first position.

ASA B. CARMICHAEL.